United States Patent [19]
Nakasuji

[11] Patent Number: 5,896,985
[45] Date of Patent: *Apr. 27, 1999

[54] COMPACT DISK TRAY

[75] Inventor: Tamotsu Nakasuji, Higashiosaka, Japan

[73] Assignee: Sanei Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/842,299

[22] Filed: May 5, 1997

[30] Foreign Application Priority Data

May 8, 1996 [JP] Japan ................................. 8-113625

[51] Int. Cl.$^6$ ................................................. B65D 85/57
[52] U.S. Cl. ........................................ 206/308.2; 206/1.5
[58] Field of Search .............................. 206/308.1, 310, 206/309, 308.2, 1.5, 807; D6/634

[56] References Cited

U.S. PATENT DOCUMENTS

| | | | |
|---|---|---|---|
| 4,499,994 | 2/1985 | Rentch | 206/310 |
| 4,709,813 | 12/1987 | Wildt | 206/310 |
| 4,750,618 | 6/1988 | Schubert | 206/310 |
| 5,400,902 | 3/1995 | Kaminski | 206/310 |
| 5,402,882 | 4/1995 | Bandy et al. | 206/310 |

FOREIGN PATENT DOCUMENTS

| | | | |
|---|---|---|---|
| 2735850 | 2/1978 | Germany | 206/310 |

*Primary Examiner*—David T. Fidei
*Attorney, Agent, or Firm*—Merchant, Gould, Smith, Edell, Welter & Schmidt, P.A.

[57] ABSTRACT

A compact disk tray comprises a tray body and a locking assembly to be inserted into a center hole of a compact disk so as to hold the compact disk. The locking assembly includes a holding structure formed on the tray body and a stopper member to be engaged with the holding structure so as to prevent the compact disk from being removed. The engagement of the holding structure and the stopper member can be released only by a lock releasing device.

10 Claims, 7 Drawing Sheets

COMPACT DISK TRAY

BACKGROUND OF THE INVENTION

1. Field of the Invention

The present invention relates to a compact disk tray which is contained in a compact disk container and holds a compact disk.

2. Prior Art

In recent years, rental shops of compact disks of music, game programs or the like have employed a disk container holder. The disk container holder contains therein a compact disk container and has a theft detection tag unremovably attached on the outer surface so as to keep the compact disk container from being opened when the container with a compact disk therein is displayed.

Such shops also employ a theft preventive gate system (merely called "gate system") installed at the exit which detects the theft detection tag attached to the disk container holder so as to detect one taking the compact disk container inside the disk container holder out of the shop. Therefore, when a customer rents a compact disk, a shop clerk removes the compact disk container out of the container holder using a lock releasing device. In other words, rental shops prevent thefts of compact disks by using a combination of the disk container holder that has the theft detection tag and the gate system that activates an alarm.

However, a conventional disk container holder is customarily bulky (as seen in, for example, Japanese Patent Application No. 8-12789 by Sanei Co., Ltd.), resulting in high costs and large occupation space for rental shops. Thus, the conventional disk container holder has problems such that the shop shoulders the burden of cost and is restricted in the number of disks that can be displayed due to limited space.

Accordingly, rental shops of compact disks which employ the gate system have desired an improved means which is capable of preventing thefts effectively by using a useful means along with the gate system and displaying many compact disks in a limited space, while keeping costs low.

SUMMARY OF THE INVENTION

It is hence an object of the present invention to provide a compact disk tray capable of preventing thefts effectively by using the compact disk tray together with a gate system.

It is another object of the present invention to provide a compact disk tray which allows many compact disks to be displayed in a limited space.

It is a further object of the present invention to provide a low cost theft preventive compact disk container.

A compact disk tray of the present invention comprises a tray body which is installed in a compact disk container and a locking means which engages a center hole of a compact disk for holding the compact disk. The locking means comprises a holding means provided on the tray body and a stopper means to be engaged with the holding means so as to prevent the compact disk from being removed from the tray body. The engagement of the holding means and the stopper means can be released only by a lock releasing means.

DETAILED DESCRIPTION OF THE PREFERRED EMBODIMENTS

Figure 1:
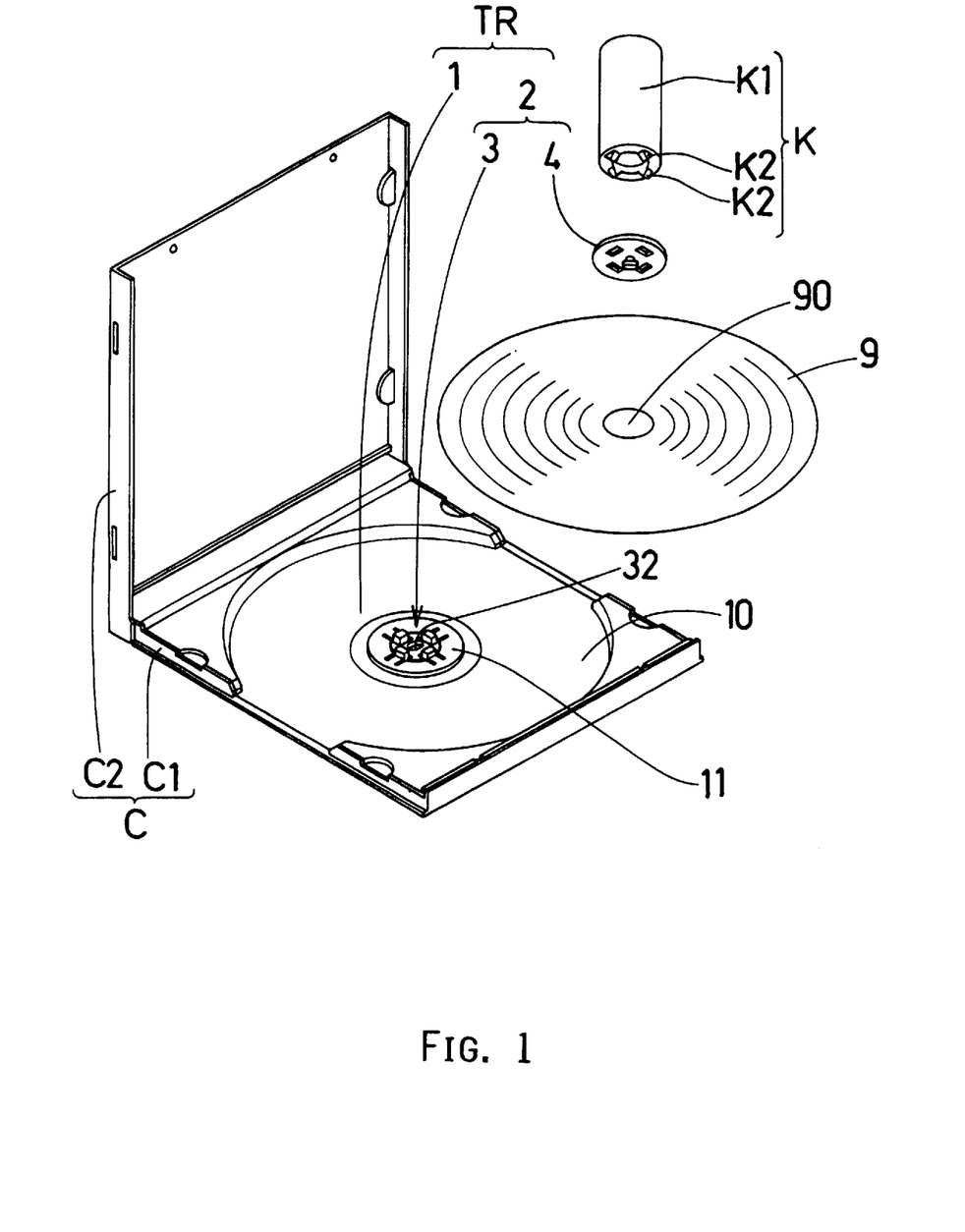
FIG. 1 shows a perspective view of an embodiment of a compact disk tray of the present invention along with a compact disk, a compact disk container and a lock releasing means, the compact disk tray being fixed in the compact disk container.

FIG. 1 shows a compact disk tray TR fixed in a compact disk container C. In the drawing, the reference numeral 9 designates a compact disk, and the numeral K designates a lock releasing means. In this embodiment, though it is not shown, a means that prevents the compact disk tray TR from being easily removed from the compact disk container C is provided on the container C. In cases where the compact disk tray TR is not expected to be removed from the compact disk container C, the compact disk tray TR may be bonded to the compact disk container C.

Figure 2:
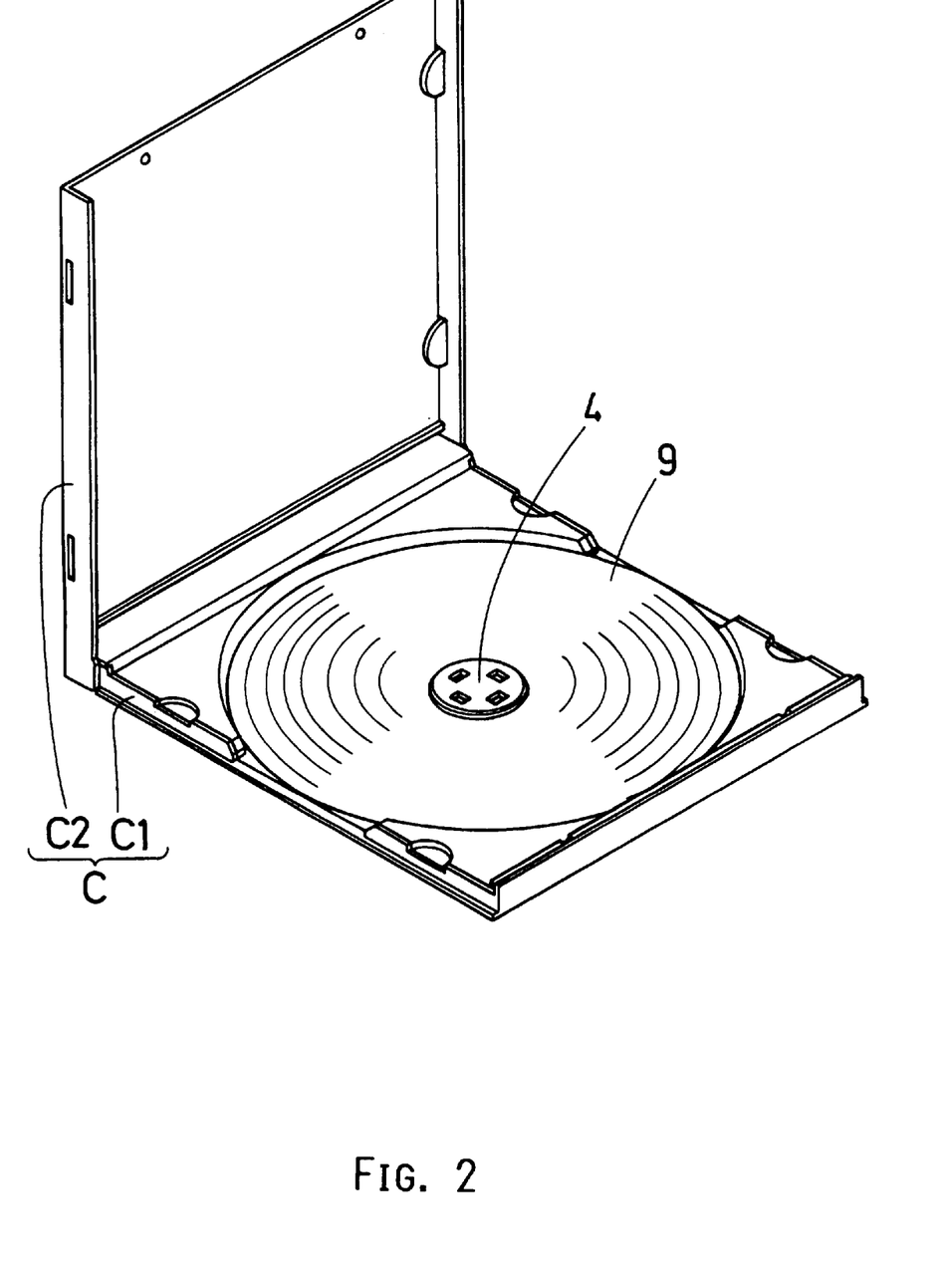
FIG. 2 is a perspective view of the compact disk tray of FIG. 1 wherein the compact disk is set on the compact disk tray.

As seen from FIGS. 1 and 2, the compact disk container C has a conventional structure, and a cover C2 is hinged to one edge of a main body C1 in a swingable or openable fashion. The main body C1 and the cover C2 are made of transparent synthetic resin.

The compact disk tray TR comprises a tray body 1 and a locking means 2. The locking means 2 comprises a holding means 3 integrally formed in the tray body 1 and a stopper means 4 which is engageable with the holding means 3 so as to prevent the compact disk 9 (set beneath the holding means 3) from being removed from the holding means 3 without the use of a lock releasing means (which will be described below).

Figure 3:
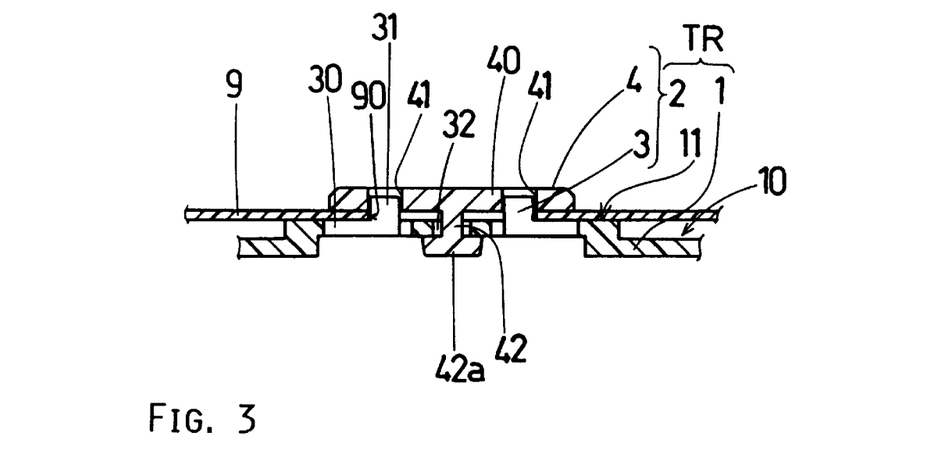
FIG. 3 is a vertical sectional view of a locking means fastened to the compact disk tray.
Figure 6:
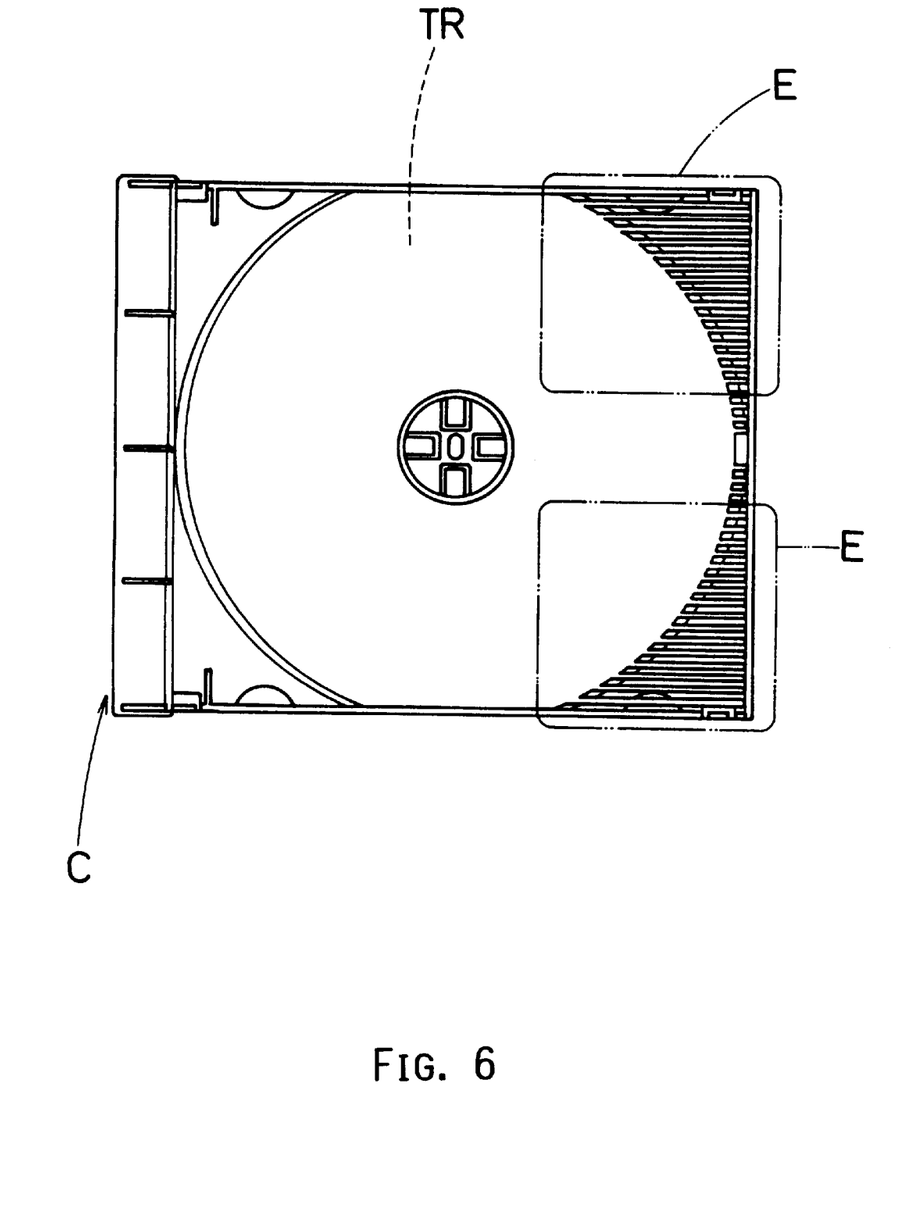
FIG. 6 is a back side view of the compact disk tray.

As shown in FIGS. 1 and 3, the tray body 1 is provided with a round recess 10 on the upper side for containing the compact disk 9 therein and a central projection 11 surrounded by the recess 10 and projected slightly from the recess 10 so as to be located at the center of the tray body 1. As shown in FIG. 6, at each one of two corners of the back side of the tray body 1, an area E is provided so that a theft detection tag (not shown) is attached in this area E. The theft detection tag may be attached on the back side (not of the tray body but) of the main body C1 of the compact disk container C.

Figure 4:
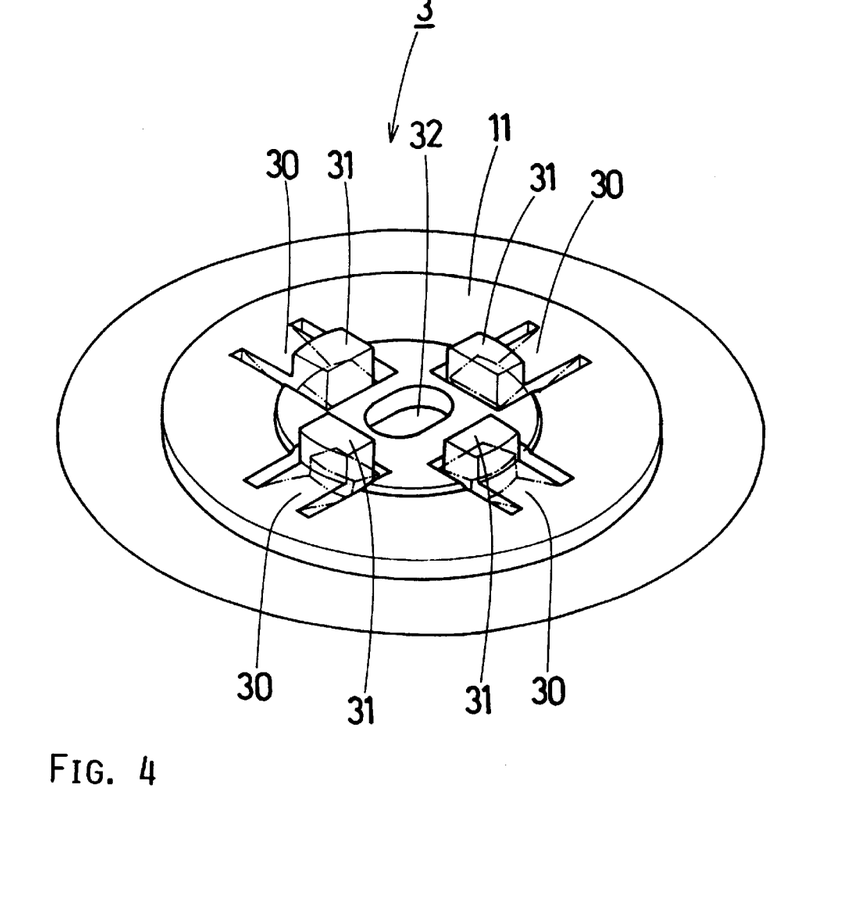
FIG. 4 is a perspective view of a holding means fastened to the compact disk tray.

Furthermore, as shown in FIGS. 3 and 4, the holding means 3 of the locking means 2 comprises elastic elements 30 circumferentially equally spaced at 90 degrees in the central projection 11, and protrusions 31 are formed on the upper surfaces of the free ends of the elastic elements 30 so as to extend upward (in FIG. 3). In addition, an elliptical hole 32 is formed in the center of the central projection 11 of the tray body 1. The elastic elements 30 is formed by providing slits on the central projection 11 as shown in FIG. 4.

The stopper means 4 of the locking means 2 is a circular plate 40 and, as shown in FIG. 3, formed to be larger than the center hole 90 of the compact disk 9. A plurality of through holes 41 (four in this embodiment so as to match the number of the protrusions 31 of the holding means 3) are formed on the circular plate 40 so as to be engaged with the protrusions 31 of the holding means 3, and a hook member 42 is formed at the center of the back side (lower side in FIG. 3) of the circular plate 40. The hook member 42 projects at right angles with reference to the circular plate 40, and an elongated, narrow catching piece 42a is formed at the end of the hook member 42. The catching piece 42a is sized so as to be inserted into the elliptical hole 32 of the holding means 3. More specifically, the length of the catching piece 42a is shorter than the larger diameter of the elliptical hole 32 but is longer than the smaller diameter of the elliptical hole 32.

In use, the circular plate 40 is placed on the upper surfaces of the protrusions 31 without aligning the through holes 41 to the protrusions 31 and then pressed downward (in FIG. 3) overcoming the elasticity of the 30 until the catching piece 42a passes through the elliptical hole 32 and projects out of the elliptical hole 32. Then, the circular plate 40 is rotated (for instance, 90 degrees) so that the elongated, narrow catching piece 42a and the elliptical hole 32 are brought into a crossed positional relationship in top view, and the protrusions 31, which have elastically returned to its original position, enter into the through holes 41 of the circular plate 40. As a result, the circular plate 40 is not allowed to rotate; and the stopper means 4 is locked to the holding means 3 and prevented from being released from the holding means 3 as shown in FIG. 3.

The thus locked stopper means 4 is removed by use of a lock releasing means K.

As shown in FIG. 1, the lock releasing means K has a cylindrical body K1 and is provided with claws K2 formed on one end of the cylindrical body K1. The claws K2 having sizes slightly smaller than the through holes 41 of the circular plate 40 are formed in the same number (four in the embodiment) as the through holes 41 and the protrusions 31.

Figure 5:
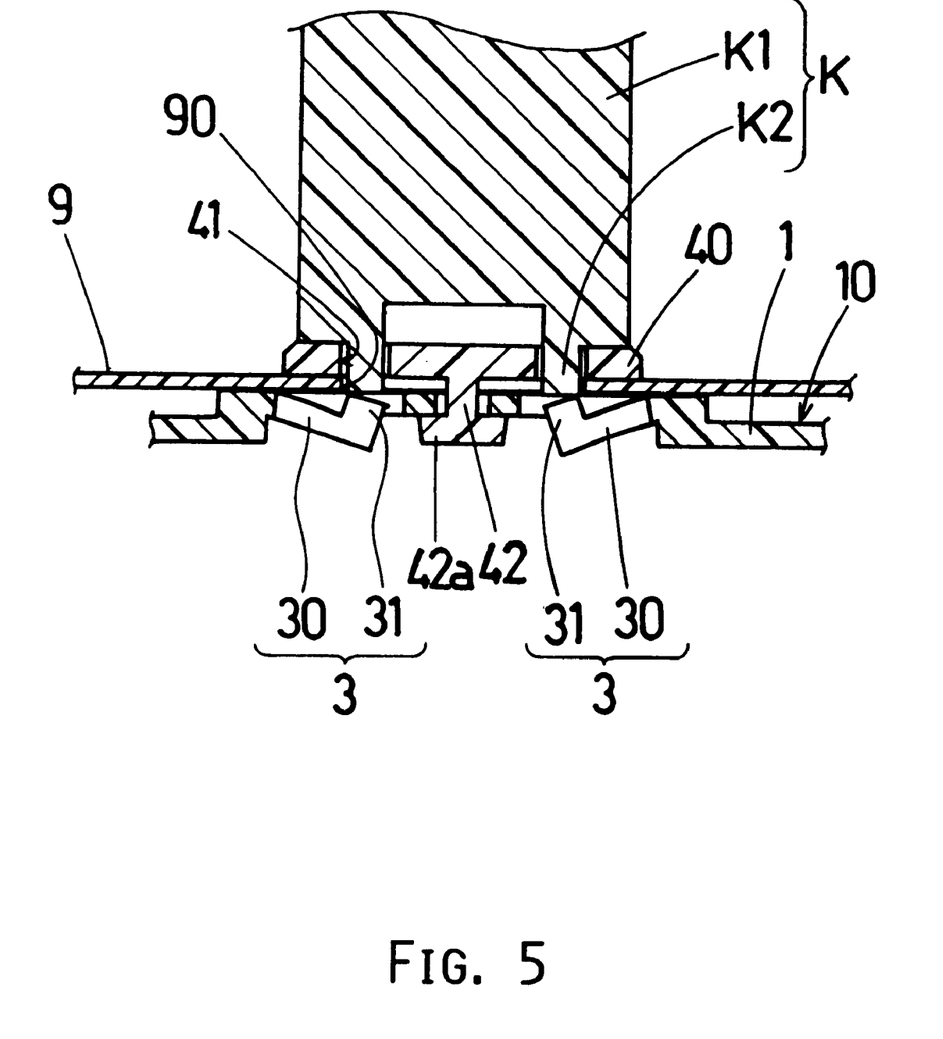
Fig. 5 is a sectional view of the locking means of FIG. 3, showing the elastic elements of the holding means being pushed down by a lock releasing means.

Thus, when the claws K2 are inserted into the through holes 41 of the stopper means 4, as shown in FIG. 5, the claws K2 push down the protrusions 31 of the elastic elements 30; as a result, the elastic elements 30 are elastically bent, so that the circular plate 40 can be rotated by the lock releasing means K, thus releasing the engagement between the stopper means 4 and the holding means 3.

As seen from FIG. 5, each of the claws K2 has a height at least larger than the thickness of the circular plate 40 so that the protrusions 31 are completely pushed out of the through holes 41 of the circular plate 40 by the claws K2 so that the circular plate 40 becomes rotatable.

As seen from the above, when the compact disk 9 is set on the compact disk tray TR and the circular plate 40 is locked, the compact disk 9 cannot be removed unless the lock releasing means K is used.

The employment of the compact disk container C that includes the compact disk tray TR of the present invention by the shop having the gate system has the following advantages.

As described above, a theft detection tag(s) is attached to the area(s) E of the back side of the tray body 1, the tray body 1 is fixed in the compact disk container C, the compact disk 9 is set on the tray body 1 in the compact disk container C with use of the locking means 2 so as to be prevented from being removed, and the compact disk container C containing the compact disk 9 is displayed in the shop. In cases where one attempts to take the container C, the gate system detects the theft detection tag and activates an alarm. Therefore, thefts can be prevented, and the compact disk 9 is prohibited from being taken out of the shop.

Since the compact disk tray TR of the present invention can be manufactured simply by adding a locking means to a conventional compact disk tray, the compact disk tray TR is not bulky and can be manufactured at a low cost. Therefore, the costs of the compact disk tray of the present invention are low and many compact disks can be displayed in a limited space.

In practical use of the compact disk tray of the present invention, when a customer brings the compact disk container C containing the desired compact disk before the gate system, a shop clerk removes the compact disk from the compact disk tray TR with the lock releasing means K and puts the compact disk 9 into a bag so that only the disk can be taken out of the store for renting. It is also possible that the shop clerk removes the locking means 2 from the compact disk tray TR with the lock releasing means K and puts the compact disk container C containing the compact disk into a special rental bag, which prohibits the gate system from activating.

Figure 7:
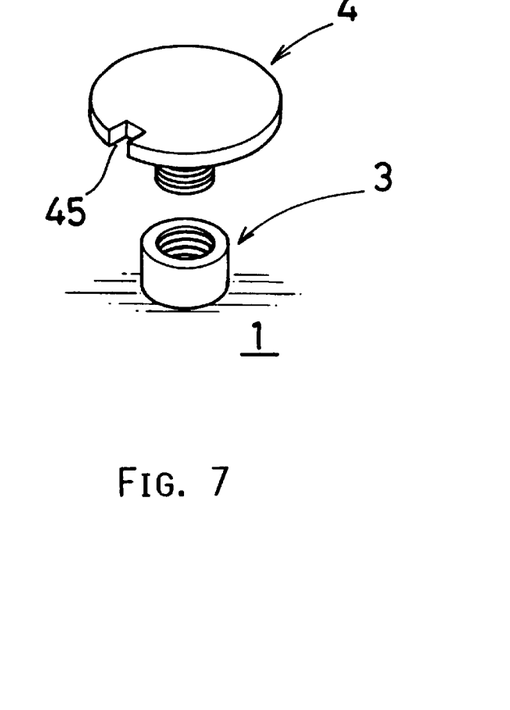
FIG. 7 is a perspective view of another variation of a locking means of FIG. 3.
Figure 8:
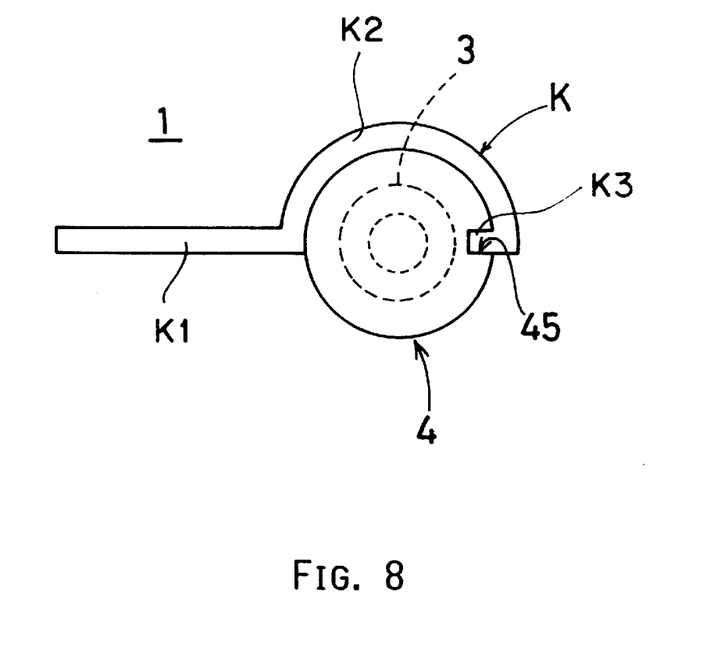
FIG. 8 is a top view of the locking means of FIG. 7 wherein a lock releasing means is engaged with the locking means.

Another variation of the locking means of the compact disk tray is shown in FIGS. 7 and 8. This locking means comprises a holding means 3 and a stopper means 4. The holding means 3 is a hollow cylindrical member that is securely disposed on the tray body 1 and formed with an internal thread. The stopper means 4 includes a top plate provided with a recess 45 on the circumferential edge thereof so as to be engageable with a lock releasing means K, and the stopper means 4 further includes an external thread shank. As seen from FIG. 8, the lock releasing means K comprises a handle K1, a semicircular portion K2 and an engagement projection K3. A compact disk is held (or locked) by the stopper means 4 that is screw engaged with the holding means 3; and the stopper means 4 is removed from the holding means 3 when rotated by the lock releasing means K that is engaged at its engagement projection K3 with the recess 45, thus allowing the compact disk to be released from the holding means 3.

Figure 9:
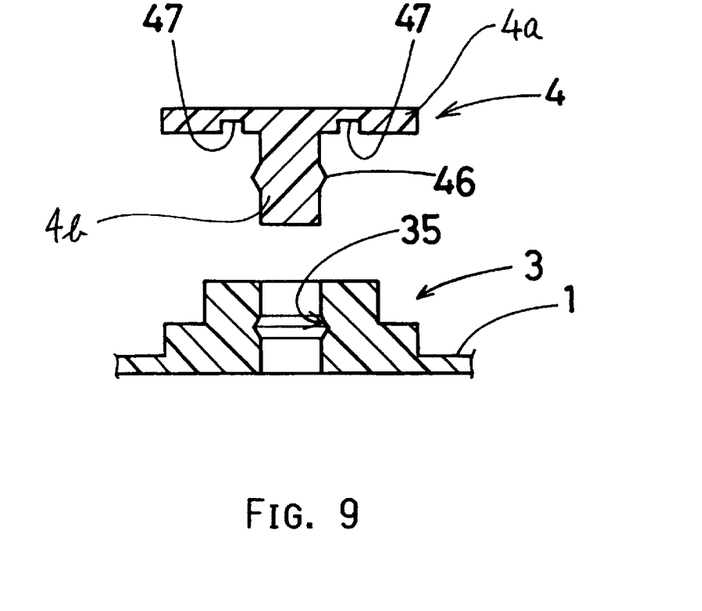
FIG. 9 is a sectional view of a still another variation of a locking means.
Figure 10:
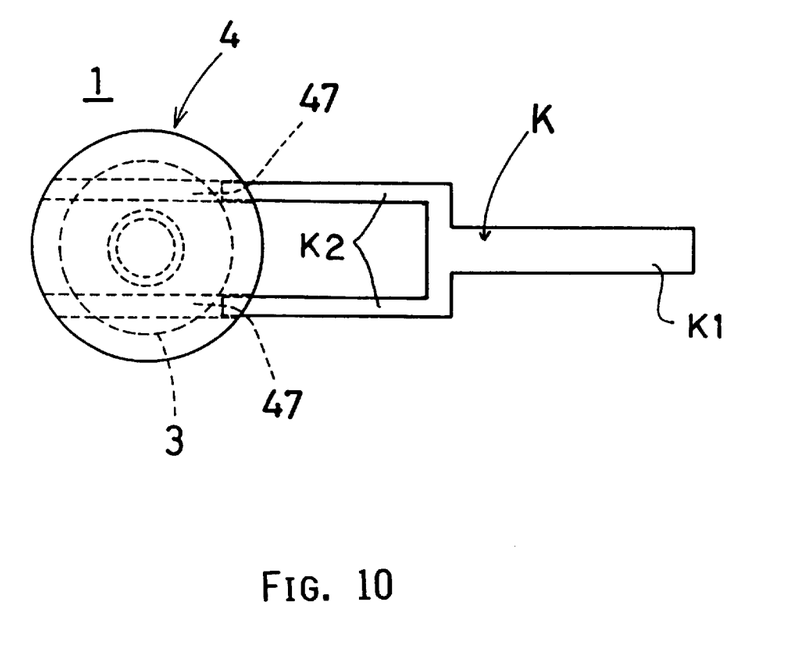
FIG. 10 is a top view of the locking means of FIG. 9 wherein a lock releasing means is in progress to be inserted into the locking means.

The third variation of the locking means of the compact disk tray is shown in FIGS. 9 and 10. This locking means comprises a holding means 3 and a stopper means 4. The holding means 3 of a hollow cylinder is formed on the tray body 1 and has a circular groove 35 inside; and the stopper means 4 is comprised of a plate member 4a with two straight grooves 47 formed on one side thereof and a shank 4b having an external peripheral projection 46, which is snap-fitted into the circular groove 35. The lock releasing means K used in this embodiment comprises a handle K1 and bifurcated claws K2 engageable with the straight grooves 47 of the stopper means 4. A compact disk is placed on the holding means 3 and the stopper means 4 is pressed down so that the peripheral projection 46 engages the circular groove 35. The stopper means 4 is thus securely fitted on the holding means 3 and prohibits the compact disk from being removed. The stopper means 4 is removed from the holding means 3 when the bifurcated claws K2 of the lock releasing means K are brought into the straight grooves 47 and raised so that the peripheral projection 46 is forced out of the engagement with the circular groove 35, thus allowing the compact disk to be released from the holding means.

As seen from the above, the locking means of the compact disk tray can be varied as long as the engagement of the holding means and the stopper means of the locking means prevents a compact disk from being removed from the compact disk tray without the use of the lock releasing means.

What is claimed is:

1. A disk locking structure for a compact disk container which comprises a container main body, a cover which is openably provided on said main body, and a tray body installed in said main body, said tray body including a central projection, on which a center aperture of a compact disk is fitted, and a recess surrounding said central projection, said disk locking structure comprising:

a holding element formed in said central projection;

a stopper means for engaging the holding element to prevent said compact disk from being removed from said central projection; and lock releasing means for allowing said compact disk to be removed from said central projection, wherein said holding element comprises a plurality of elastic members formed in said central projection and provided with protrusions thereon, said holding element further comprising an elliptical hole opened at a center of said central projection; and said stopper means comprises a plate member provided with a plurality of through holes engageable with said protrusions and a hook member projecting from one side of said plate member with an elongated catching means formed at one end thereof, said elongated catching means being allowed to pass through said elliptical hole in one orientation and prohibited to pass through said elliptical hole in another orientation.

2. A disk locking structure according to claim 1, wherein said lock releasing means comprises a cylindrical main body and a plurality of claws that are brought into said through holes so as to disengage said protrusions from said through holes.

3. A disk locking structure according to claim 1, wherein said holding means is a hollow cylindrical member with an internal thread formed on an interior surface thereof; and said stopper means comprises a plate member formed with a recess on a circumferential edge thereof and a shank member provided on one side of said plate member, said shank member being formed with an external thread on an outer surface thereof so as to be screw-engaged with said internal thread of said holding means.

4. A disk locking structure according to claim 3, wherein said lock releasing means is comprised of a handle, a semicircular section formed at one end of said handle, and an engagement projection formed at an end of said semicircular section so as to be engageable with said recess of said plate member of said stopper means.

5. A disk locking structure according to claim 1, wherein said holding means is a hollow cylindrical member with a circular groove formed inside thereof; and said stopper means comprises a plate member which is provided with a plurality of grooves formed on one side of said plate member and a shank member formed on said one side of said plate member, said shank member being formed with an external peripheral projection which is snap-fitted to said circular groove of said holding means.

6. A disk locking structure according to claim 5, wherein said lock releasing means comprises a handle and bifurcated claws which extend from one end of said handle so as to engage said plurality of grooves of said stopper means.

7. A disk locking system comprising:

a case;

a tray body positioned within the case, the tray body including a central projection on which a center aperture of a disk can be fitted;

a plurality of resilient aims formed in the tray body, the arms having upwardly projecting locking tabs that at least partially form the central projection;

a hub for securing the disk to the tray body, the hub being moveable between first and second rotational orientations, the hub defining a plurality of throughholes that receive the locking tabs of the of the resilient members to lock the hub in the first rotational orientation;

a locking opening defined through one of the tray body and the hub; and a locking post formed on the other of the tray body and the hub, the locking post being configured to pass through the locking opening when the hub is positioned in the first rotational orientation, and the locking post being configured to not pass through the locking opening when the hub is positioned in the second rotational orientation.

8. The disk locking system of claim 7, wherein the locking opening is formed through the central projection of the tray body, and tie locking post is formed on the hub.

9. The disk locking system of claim 7, wherein the locking post includes an elongated catch portion that is transversely aligned with respect to a main portion of the locking post.

10. The disk locking system of claim 7, wherein the locking opening is elliptical.

* * * * *